United States Patent
Itul et al.

(10) Patent No.: US 11,111,177 B2
(45) Date of Patent: Sep. 7, 2021

(54) MANUFACTURING A BINDER WITH HIGH β BELITE CONTENT

(71) Applicant: HeidelbergCement AG, Heidelberg (DE)

(72) Inventors: Anca Itul, Heidelberg (DE); Mohsen Ben Haha, Heidelberg (DE)

(73) Assignee: HConnect 2 GmbH, Heidelberg (DE)

( * ) Notice: Subject to any disclaimer, the term of this patent is extended or adjusted under 35 U.S.C. 154(b) by 0 days.

(21) Appl. No.: 16/649,317

(22) PCT Filed: Sep. 12, 2018

(86) PCT No.: PCT/EP2018/074603
§ 371 (c)(1),
(2) Date: Mar. 20, 2020

(87) PCT Pub. No.: WO2019/063290
PCT Pub. Date: Apr. 4, 2019

(65) Prior Publication Data
US 2020/0262751 A1    Aug. 20, 2020

(30) Foreign Application Priority Data
Sep. 26, 2017   (EP) .................................. 17193149

(51) Int. Cl.
| C04B 7/43 | (2006.01) |
| C04B 7/345 | (2006.01) |
| C04B 40/00 | (2006.01) |
| C04B 28/02 | (2006.01) |

(52) U.S. Cl.
CPC .............. C04B 7/43 (2013.01); C04B 7/3453 (2013.01); C04B 40/0082 (2013.01); C04B 28/025 (2013.01)

(58) Field of Classification Search
CPC ....... C04B 7/43; C04B 7/3453; C04B 28/025; C04B 40/0082
See application file for complete search history.

(56) References Cited

U.S. PATENT DOCUMENTS

| 5,509,962 A | 4/1996 | Tang |
| 9,321,682 B2 | 4/2016 | Ben Haha et al. |
| 2015/0166409 A1 | 6/2015 | Ben Haha et al. |
| 2018/0305253 A1 | 10/2018 | Ben Haha et al. |

FOREIGN PATENT DOCUMENTS

| CA | 2989366 A1 * | 12/2016 | ............... C04B 7/43 |
| DE | 138197 A1 | 10/1979 | |
| DE | 3414196 A1 | 10/1985 | |
| DE | 102005037771 A1 | 2/2007 | |
| DE | 102009018632 A1 | 9/2011 | |
| EP | 2676943 A1 | 12/2013 | |
| GB | 2013648 A | 8/1979 | |
| WO | 2016202439 A1 | 12/2016 | |

OTHER PUBLICATIONS

International Search Report of PCT/EP2018/074603, dated Nov. 2, 2018.
H. Ishida, S. Yamazaki, K. Sasaki, Y. Okada, T. Mitsuda, [alpha]-Dicalcium Silicate Hydrate: Preparation, Decomposed Phase, and Its Hydration, J. Am. Ceram. Soc. 76, p. 1707-1712, 1993.
International Preliminary Report on Patentability dated Mar. 31, 2020 in PCT/EP2018/074603.

* cited by examiner

*Primary Examiner* — Anthony J Green
(74) *Attorney, Agent, or Firm* — Collard & Roe, P.C.

(57) ABSTRACT

The present invention relates to a method for manufacturing a binder with high β belite content comprising the steps:
a) providing a starting material by selecting one raw material having a Ca/Si molar ratio of 1.5 to 2.5 or by mixing two or more raw materials to obtain a starting material with the Ca/Si molar ratio of 1.5 to 2.5;
b) hydrothermal treatment of the starting material produced in step a) in an autoclave at a temperature of 100 to 300° C. and a retention time of 0.1 to 24 h, wherein the water/solids ratio is from 0.1 to 100 to provide an intermediate product;
c) annealing the intermediate product obtained in step b) in a flash calciner at 620 to 630° C., wherein the retention time is 1-30 seconds.

20 Claims, 1 Drawing Sheet

MANUFACTURING A BINDER WITH HIGH β BELITE CONTENT

CROSS REFERENCE TO RELATED APPLICATIONS

This application is the National Stage of PCT/EP2018/074603 filed on Sep. 12, 2018, which claims priority under 35 U.S.C. § 119 of European Application No. 17193149.6 filed on Sep. 26, 2017, the disclosures of which are incorporated by reference. The international application under PCT article 21(2) was not published in English.

BACKGROUND OF THE INVENTION

The present invention relates to a method for manufacturing a binder with high β belite content.

Cement as an hydraulic binder is an important industrial product that consists to a large extent of Portland cement clinker. This clinker is produced by sintering a mixture of limestone, sand, clay and corrective materials at approximately 1450° C. After the high-temperature reaction, the following foreign oxide-containing phases are present: alite ($Ca_3SiO_5$, also known as $C_3S$), belite ($Ca_2SiO_4$, also known as $C_2S$), aluminate ($Ca_3Al_2O_6$, also known as $C_3A$) and ferrite ($Ca_2(Al_xFe_{1-x})_2O_5$, also known as $C_4AF$). Here, belite primarily occurs in the form of the β polymorph.

Hydraulic reactivity describes the reaction of a binder with water, forming a solid material. By contrast to that of alite, belite hydration takes place slowly over several months and years.

It is known that the reactivity of belite with water can be improved by mechanochemical activation (DD 138197 A1), fast cooling after the burning process (DD138197 A1 and DE3414196 A1) and the integration of foreign oxides (U.S. Pat. No. 5,509,962 A and DE 3414196 A1). Moreover, as well as the β variant of belite, other polymorphs are known, which have a better (α, α'H, α'L and x) or poorer reactivity (γ).

From H. Ishida, S. Yamazaki, K. Sasaki, Y. Okada, T. Mitsuda, [alpha]-Dicalcium Silicate Hydrate: Preparation, Decomposed Phase, and Its Hydration, J. Am. Ceram. Soc. 76, p. 1707-1712, 1993, a method for the production of α-dicalcium silicate hydrate (α-C2SH) at 200° C. by a two-hour-long hydrothermal treatment of quickburnt lime (CaO) and silicic acid for laboratory syntheses (degree of purity p.a.) is known. In the temperature range of 390–490° C., α-$C_2$SH is converted into various $C_2$S modifications that pass into the α'L phase when heated further to 920-960° C. and form β-$C_2$S when cooling. What is disadvantageous here is the high proportion of inert γ-$C_2$S.

In DE 10 2009 018 632, a method for the production of a belite-containing binder is disclosed, in which an intermediate product that was produced at 120-250° C. by hydrothermal treatment of the starting material with a Ca/(Si+Al) molar ratio of between 1.5 and 2.5 is subjected to reactive grinding at 100-200° C. for between 5 minutes and 30 minutes. It is disadvantageous that the reactive grinding is a non-energy-efficient step. Furthermore, a sufficient level of compressive strength after the hardening can only be achieved by adding superplasticizers.

DE 10 2005 037 771 discloses a method for the production of belite cement in which α-dicalcium silicate hydrate (α-$C_2$SH) arises at 100-300° C. by a hydrothermal treatment of the starting material that contains CaO and $SiO_2$ in a Ca/Si molar ratio of 1.5-2.5. In the temperature range between 500 and 1000° C., α-$C_2$SH is converted into hydraulically reactive $C_2$S modifications (belite cement). The disadvantage of this is that the burning process must be carried out at a relatively high temperature (over 500° C.). These high temperatures moreover reduce the reactivity of the binder.

US 2015/0166409 A1 describes a method for the production of a binder, comprising the steps mixing raw materials to provide a starting material that has a Ca/Si molar ratio of 1.5 to 2.5, hydrothermal treatment of the starting material produced in step b) in an autoclave at a temperature of 100 to 300° C. and a retention time of 0.1 to 24 h, wherein the water/solids ratio is 0.1 to 100, annealing the intermediate product obtained in step c) at 350 to 495° C., wherein the heating rate is 10-6000° C./min and the retention time is 0.01-600 minutes, wherein, during the mixing b) and/or in the following steps, 0.1 to 30% by weight of additional elements and/or oxides are added. WO 2016/202439 A1 discloses a method for producing cements by hydrothermally treating a starting material containing sources of CaO and $SiO_2$ in an autoclave at a temperature of 100 to 300° C., and tempering the obtained intermediate product at 350 to 700° C., wherein water formed during tempering is dissipated by grinding the intermediate product and/or tempering taking place under a continuous gas stream. Both methods provide reactive products suitable as binder, but increased reactivity is always sought for, nonetheless.

SUMMARY OF THE INVENTION

The object was therefore to propose a method for the production of binders, with which an increased level of reactivity of the binder that is based on a belite phase can be achieved, in order to thereby produce high-performance cements having a high content of these phases. Thus, substantially lower carbon dioxide emissions should be achieved than with conventional Portland cements that have a high alite proportion.

This object is solved by a method for manufacturing a binder with high β belite content, i.e. at least 20% by weight, comprising the steps:

a) providing a starting material by selecting one raw material having a Ca/Si molar ratio of 1.5 to 2.5 or by mixing two or more raw materials to obtain a starting material with the Ca/Si molar ratio of 1.5 to 2.5;
b) hydrothermal treatment of the starting material produced in step a) in an autoclave at a temperature of 100 to 300° C. and a retention time of 0.1 to 24 h, wherein the water/solids ratio is from 0.1 to 100 to provide an intermediate product;
c) annealing the intermediate product obtained in step b) in a flash calciner at 620 to 630° C., wherein the retention time is 1-30 seconds.

So as to simplify the description the following abbreviations that are usual in the cement industry are used herein: H—$H_2O$, C—CaO, A—$Al_2O_3$, F—$Fe_2O_3$, M—MgO, S—$SiO_2$ and $—$SO_3$. Compounds are mostly named by the pure form, without explicit mentioning of solid solutions, foreign ion substitution and impurities etc. as are usual in technical and industrial materials. As the man skilled in the art knows, the exact composition of the phases described may vary due to substitution with foreign ions. Such compounds are comprised when mentioning the pure form herein unless it is expressly stated otherwise.

Cement is used to designate a material that, after mixing with water to form a paste, is able to develop mechanical strength by hydraulic hardening. Thus, cement denotes a clinker ground with or without further components, and other mixtures like super sulphated cement, geopolymer binder, and belite cement obtained by hydrothermal treatment. Binder or binder mixture means a material or mixture containing cement and developing mechanical strength by a hydraulic reaction with water, wherein the binder typically but not necessarily contains more components than the cement. A binder is used adding water or another liquid and mostly also aggregate as well as optionally admixtures and/or additives.

The term "reactive" shall mean a hydraulic reactivity unless specified otherwise.

The method according to the invention uses a starting material wherein the molar ratio of calcium to silicon ranges from 1.5 to 2.5, preferably is about 2, i.e. 2±10%, most preferred is 2.

Primary and/or secondary raw materials may be used to provide the starting material. In a preferred embodiment, quartz, sand or gravel are used as raw materials for the starting material. Raw materials that contain CaO as well as $SiO_2$ are particularly preferred, such that the desired Ca/Si ratio is already present. If the desired Ca/Si ratio is not present, the materials have to be adjusted with respect to their chemical composition before further treatment by adding further reaction partners such as solids containing calcium or silicon in order to set the required Ca:Si ratio. Portlandite ($Ca(OH)_2$) or burnt or unburnt lime, for example, are suitable for increasing the calcium content and quartz or silica rich fly ash for increasing the silicon content.

As a rule, the raw materials are also optimised with respect to particle size and particle size distribution by mechanical or thermal treatment, wherein the thermal treatment may also lead to an optimisation of the chemical composition.

In a preferred embodiment, fine grain material is selected as the starting material, the largest grain of which is preferably 0.1 mm maximum. For this, the finer grain fractions from the reprocessing of cement-containing binders in building materials such as old concretes and cements are in particular used. A finer starting material is advantageous both with respect to the conversion speed and also with respect to the effort expended for the grinding of the completed cement. With a correspondingly fine starting material, grinding may be unnecessary.

In one embodiment additional elements, also in the form of compounds like oxides, are added in an amount from 0.1 to 30% by weight to the raw materials or during the mixing of the raw materials, for hydrothermal treatment or for annealing. Sodium, potassium, boron, sulphur, phosphorous or combinations thereof are preferred as these additional elements. Specifically, alkaline salts or alkaline earth salts and/or hydroxides of the elements are suitable. Especially preferred are $CaSO_4.2H_2O$, $CaSO_4.\frac{1}{2} H_2O$, $CaSO_4$, $CaHPO_2.2H_2O$, $Ca_3P_2O_8$, NaOH, KOH, $Na_2CO_3$, $NaHCO_3$, $K_2CO_3$, $MgCO_3$, $MgSO_4$, $Na_2Al_2O_4$, $Na_3PO_4$, $K_3PO_4$, $Na_2[B_4O_5(OH)_4].8H_2O$ etc. In a preferred embodiment, the starting material mixture has a P/Si molar ratio of approximately 0.05 and/or an S/Si molar ratio of approximately 0.05 and/or a K/Ca molar ratio of approximately 0.05.

The raw material mixture, which is optionally pre-treated as described, can optionally be mixed, i.e. seeded, with $\alpha$-$C_2SH$ crystal nuclei. This accelerates the conversion. Typically seeding occurs with 0.01-30% by weight of different compounds containing one or more of calcium silicate hydrate like $\alpha$-$C_2SH$, afwillite, calcio-chondrodite, for example.

The mixture of the raw materials can be burnt in an additional step. This step is particularly preferred for the use of industrial by-products or relatively poorly reactive or coarse materials as raw materials. Here, temperatures of 400 to 1400° C., preferably 750 to 1100° C., are suitable. The burning duration lasts 0.1 to 6 hours, preferably 1 hour. By burning the raw materials, the advantage arises that materials that would otherwise hardly be able to be used or would be unable to be used (e.g. crystalline ash and slag etc.) can be rendered useful in a targeted manner by improved/greater ability for conversion into the intermediate product $\alpha$-$C_2SH$ in the autoclave being enabled (by deacidification and/or dehydration . . . ).

The produced starting material, which is optionally seeded and/or burnt as described above, is then subjected to a hydrothermal treatment in an autoclave at a temperature of 100 to 300° C., preferably 150° C. to 250° C. A water/solid ratio of 0.1 to 100, preferably 2 to 20, and retention times of 0.1 to 24 hours, preferably 1 to 16 hours, have proven suitable. The hydrothermal treatment converts the starting material into an intermediate product containing at least one calcium silicate hydrate and, optionally, further compounds.

In the following step the intermediate product is annealed at a temperature of 620° C. to 630° C., preferably at 625° C.±2° C., most preferred at 625° C., in a flash calciner. The retention time is adjusted in the range from 1 to 30 seconds, preferably 1 to 3 seconds. The intermediate product can be used as obtained in many cases. If the water content is higher than desired, the product can be separated from at least a part of the water, e.g. by filtering, and/or dried.

Surprisingly, the product of this annealing for a short time and at a high temperature provides high amounts of a very reactive $\beta$ belite and an amorphous phase. This is in contrast to the product dominated by x belite obtained when tempering for longer times at lower temperatures as disclosed in EP 2 676 943 A1.

The product obtained after cooling is the desired, hydraulically reactive binder. It contains at least 30% by weight, often 50% by weight or more and even 70% or more of $\beta$-$C_2S$ and an X-ray amorphous phase of variable composition. Besides, minor amounts of starting material and intermediate product as well as of x-$C_2S$ and reactive $\gamma$-$C_2S$ having a phase-specific degree of hydration of, mostly, at least 50% in the first 7 days after being mixed with water, can be contained. Preferably, the amount of remaining starting material and intermediate product should be as low as possible, especially the conversion of the intermediate product is desirably (almost) complete. The content of $\beta$ $C_2S$ usually ranges from 20 to 50% by weight, often from 20 to 30% by weight and the content of the X ray amorphous phase from 30 to 70% by weight, often from 45 to 60% by weight.

The BET surface of the binder usually ranges from 1 to 30 $m^2/g$. The $SiO_2$ tetrahedrons in the binder have an average degree of condensation of less than 1.0. The water content in the binder is typically less than 3.0% by weight. The binder is optionally ground to a desired level of fineness or grain size distribution in a manner that is known per se. Grinding is often not necessary when fine raw materials with an appropriate grain size distribution are used.

Hydraulically highly reactive binders based on $\beta$-$C_2S$ and X-ray amorphous phases can be produced by the method according to the invention. These are distinguished by high reactivity of the $\beta$-$C_2S$ and a high, specific surface. The binder contains only small amounts of x-$C_2S$ and $\gamma$-$C_2S$.

The use of a flash calciner, i.e. very high heating rates and short residence times are essential for the reactivity of the product. Using longer residence times like e.g. more than 60 seconds resulted in less reactive $\beta$-$C_2S$ and higher amounts of $\gamma$-$C_2S$ that has low reactivity.

The binder obtained according to the invention is suitable to replace Portland cement and other cements of the prior art in all known applications, for example as binder in concrete, mortar, screed, and tile adhesive.

The binder can also contain supplementary cementitious materials (SCM). Suitable amounts are very variable, preferably 5 to 95% by weight SCM are mixed with κ to 95% by weight of the binder obtained according to the invention, wherein the amounts add up to 100% together with all further components of the mixture. Especially preferred 30 to 85% by weight SCM are mixed with 15 to 70% by weight of the binder obtained according to the invention and most preferred 40 to 80% by weight SCM are mixed with 20 to 60% by weight of the binder obtained according to the invention.

Preferred SCM are pozzolans and latent hydraulic materials, especially tempered clays (e.g. metakaolin), tempered shale, siliceous and calcareous fly ashes (preferably such with high glass content and/or high content of reactive phases), granulated blast furnace slag, and synthetic (pozzolanic or latent hydraulic) glasses.

Preferably, a binder obtained according to the invention is also used together with admixtures and/or additives as well as optionally further hydraulic components and/or sulfate carrier.

Additives are components such as but not exclusively ground limestone, ground dolomite, precipitated $CaCO_3$, $Mg(OH)_2$, $Ca(OH)_2$, CaO, silica fume, and glass powder. Additives are usually added in a total amount from 1 to 25% by weight, preferably 3 to 20% by weight and most preferred 6 to 15% by weight.

In a preferred embodiment fillers, especially stone dust like ground limestone, are contained as an additional major component. The amount is quite variable, preferably 5 to 95% by weight filler and 5 to 95% by weight binder obtained according to the invention are used. More preferred 30 to 85% by weight filler and 15 to 70% by weight binder and most preferred 40 to 80% by weight filler and 20 to 60% by weight binder are used wherein the amounts sum up to 100% together with all further components of the mixture.

Useful sulfate carriers are alkali metal sulfates and/or alkaline earth metal sulfates, preferably in the form of gypsum, semi-hydrate, anhydrite, magnesium sulfate, sodium sulfate, potassium sulfate or any mixture of the foregoing.

In one embodiment at least one further hydraulic component is added. Portland cement is especially suitable. The amount can range from 1 to 70% by weight, preferably from 5 to 40% by weight and most preferred from 10 to 25% by weight.

The fineness usually ranges from 2000 to 20000 $cm^2/g$, preferably from 3000 to 6000 $cm^2/g$, most preferred from 4000 to 5000 $cm^2/g$ according to Blaine. Components can be ground together or separately as is known per se.

Admixtures are preferably used, especially one or more setting and/or hardening accelerator and/or fluidity enhancer and/or plasticizer and/or retarder. The known substances can be used in the usual dosage.

For use a water/binder ratio from 0.2 to 2 can be useful, typically 0.3 to 0.8 and most often 0.35 to 0.5.

DETAILED DESCRIPTION OF THE INVENTION

Figure 1A:
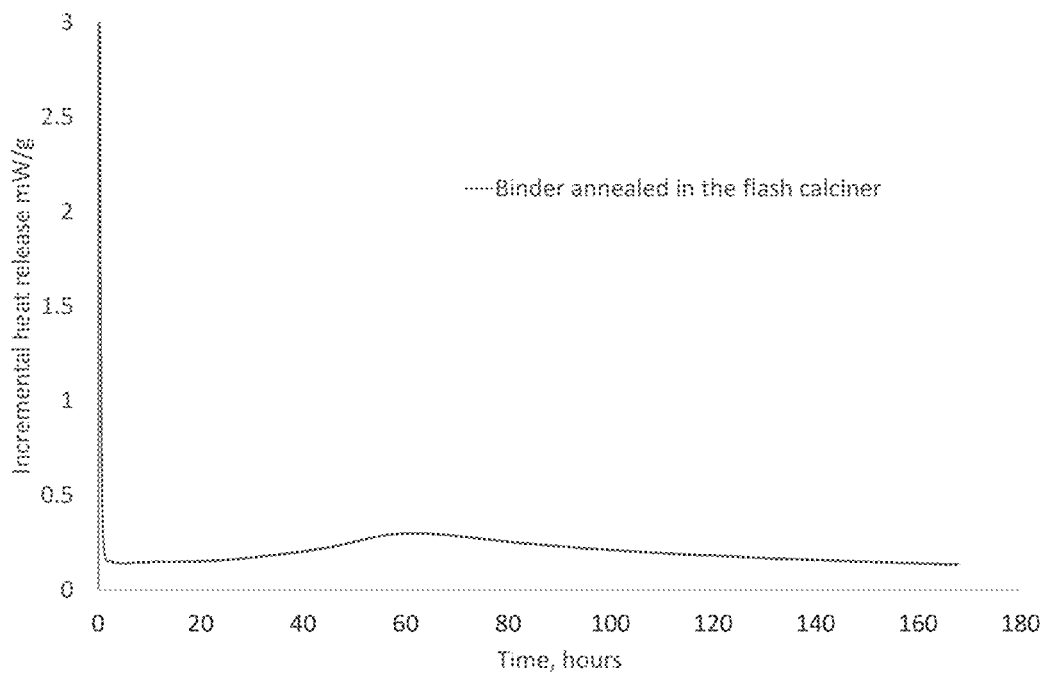
FIG. 1a shows incremental heat flow and FIG. 1b shows cumulative heat flow as measured by heat release measurements of pastes prepared according to the invention.

The invention will be illustrated further with reference to the examples that follow, without restricting the scope to the specific embodiments described. If not otherwise specified any amount in % or parts is by weight and in the case of doubt referring to the total weight of the composition/mixture concerned.

The invention further includes all combinations of described and especially of preferred features that do not exclude each other. A characterization as "approximately", "around" and similar expression in relation to a numerical value means that up to 10% higher and lower values are included, preferably up to 5% higher and lower values, and in any case at least up to 1% higher and lower values, the exact value being the most preferred value or limit.

The term "substantially free" means that a particular material is not purposefully added to a composition, and is only present in trace amounts or as an impurity. As used herein, unless indicated otherwise, the term "free from" means that a composition does not comprise a particular material, i.e. the composition comprises 0 weight percent of such material.

Example 1

A starting material mixture was made from 41.93 kg Portlandite, 18.07 kg micro-silica and 1.2 kg $\alpha$-$C_2SH$ seeds. The oxide composition of the raw materials is presented in table 1.

TABLE 1

| Component | Portlandite | Micro-silica |
| --- | --- | --- |
| $SiO_2$ | | 94.05% |
| $Al_2O_3$ | | 0.61% |
| CaO | 75.67% | 0.31% |
| MgO | | 0.59% |
| $K_2O$ | | 1.12% |
| $Fe_2O_3$ | | 0.4% |
| $Na_2O$ | | 0.21% |
| $P_2O_5$ | | 0.04% |
| Loss on ignition (1050° C.) | 24.33% | 2.73% |

The finely ground raw materials were mixed with each other and with water in a water/solids ratio of 1 and placed into an autoclave at 190° C. for 375 minutes. An intermediate product was obtained, which contained 65% $\alpha$-$C_2SH$ and had a maximum particle size of 200 μm. The intermediate product could be used as such for tempering as it contained very little water. 5 kg were fed into a flash calciner (FLSmidth, DK) having vertical cylindrical design with fuel combustion in intimate contact with the feed, a setup of 6 m and a further 3 m insulated piping before quench air is introduced before an uninsulated steel pipe that leads to the bag filter. The inlet temperature was set to 675° C. resulting in an average temperature in the calciner of 625° C. The retention time was adjusted to 1.29 seconds. The average temperature inside the insulated pipe was 455° C. and passage took 0.18 seconds. Herein, it was assumed that gas and particles have the same retention time, gases were calculated as ideal gases and the temperature was calculated as simple average for each part of the calciner. A nearly complete conversion of the intermediate product was observed, the composition of the obtained product is summarized in table 2.

TABLE 2

| Phase | formula | amount [% by weight] |
|---|---|---|
| $C_2SH$-alpha | $Ca_2(SiO_4)(H_2O)$ | 0.5 |
| γ-Belite, $C_2S$ | $Ca_2SiO_4$ | 4.7 |
| α-Belite, C2S | | 8.2 |
| χ-Belite, $C_2S$ | | 5.1 |
| β-Belite, $C_2S$ | | 43.4 |
| Σ Belite | | 61.4 |
| Dellaite | $Ca_6(Si_2O_7)(SiO_4)(OH)_2$ | not detected |
| Calcite | $CaCO_3$ | 7.2 |
| Portlandite | $Ca(OH)_2$ | 1.0 |
| Quartz | $SiO_2$ | 0.2 |
| | amorphous content | 28.7 |
| | Total | 100.0 |

Figure 1B:
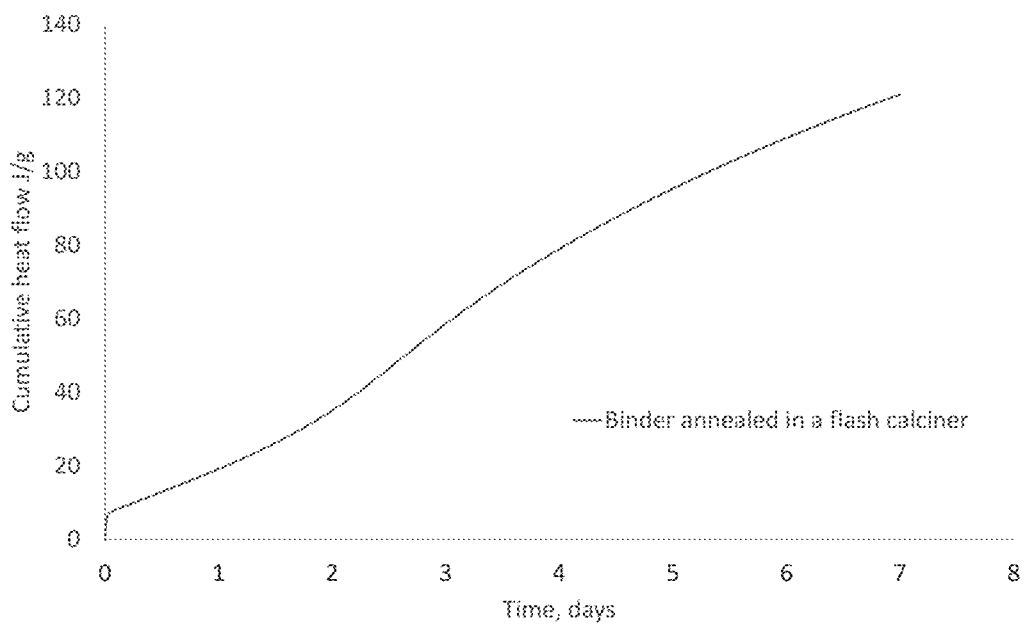

The results in table 2 show that a high amount of β belite is obtained according to the invention, while x belite and γ belite are only formed in low amounts. The amount of highly reactive X ray amorphous phase is also quite high. Reactivity was proven by calorimetry. Heat release measurements of pastes prepared with water-to-solid of 1 were recorded over 7 days by an isothermal calorimeter (TAM Air, TA Instruments, Sweden). The incremental heat flow as well as the cumulative heat flow are shown in FIGS. 1 a and b, respectively.

What is claimed is:

1. A method for manufacturing a binder with β belite content of at least 20% by weight comprising the steps:
    a) providing a starting material by selecting one raw material having a Ca/Si molar ratio of 1.5 to 2.5 or by mixing two or more raw materials to obtain a starting material with the Ca/Si molar ratio of 1.5 to 2.5;
    b) hydrothermal treatment of the starting material produced in step a) in an autoclave at a temperature of 100 to 300° C. and a retention time of 0.1 to 24 h, wherein the water/solid ratio is from 0.1 to 100 to provide an intermediate product;
    c) annealing the intermediate product obtained in step b) in a flash calciner at 620 to 630° C., wherein the retention time is 1-30 seconds.

2. The method according to claim 1, wherein the molar ratio of calcium to silicon in the starting material is 2±10%.

3. The method according to claim 1, wherein primary and/or secondary raw materials are used to provide the starting material, the primary and/or secondary raw materials being selected from the group consisting of quartz, sand, gravel, limestone, portlandite $(Ca(OH)_2)$, burnt lime, unburnt lime, silicious fly ash, calcareous fly ash, and grain fractions from the reprocessing of cement-containing binders in building materials, and mixtures thereof.

4. The method according to claim 1, wherein the raw material(s) is(are) optimised with respect to particle size and particle size distribution by mechanical or thermal treatment.

5. The method according to claim 1, wherein additional elements, also in the form of compounds, are added in an amount from 0.1 to 30% by weight to the raw material or during the mixing of the raw materials, for hydrothermal treatment or for annealing.

6. The method according to claim 1, wherein the starting material is seeded with 0.01-30% by weight of seed nuclei containing at least one calcium silicate hydrate.

7. The method according to claim 1, wherein one or more of the raw materials or the starting material is burnt at temperatures of 400 to 1400° C.

8. The method according to claim 1, wherein hydrothermal treatment occurs at a temperature of 150° C. to 250° C., with a water/solids ratio of 2 to 20, and retention times of 1 to 16 hours.

9. The method according to claim 1, wherein the intermediate product is annealed at a temperature of 625° C.±2° C. with a retention time of 1 to 3 seconds.

10. The method according to claim 2, wherein primary and/or secondary raw materials are used to provide the starting material, the primary and/or secondary raw materials being selected from the group consisting of quartz, sand, gravel, limestone, portlandite $(Ca(OH)_2)$, burnt lime, unburnt lime, silicious fly ash, calcareous fly ash, grain fractions from the reprocessing of cement-containing binders in building materials, and mixtures thereof.

11. The method according to claim 2, wherein the raw material(s) is(are) optimised with respect to particle size and particle size distribution by mechanical or thermal treatment.

12. The method according to claim 10, wherein the raw material(s) is(are) optimised with respect to particle size and particle size distribution by mechanical or thermal treatment.

13. The method according to claim 5, wherein the additional elements are selected from the group consisting of sodium, potassium, boron, sulphur, phosphorous and combinations thereof.

14. The method according to claim 6, wherein the calcium silicate hydrate is one or more of α-$C_2SH$, afwillite, calciochondrodite.

15. The method according to claim 7, wherein the starting material is burnt at temperatures of 750 to 1100° C.

16. The method according to claim 4, wherein additional elements, also in the form of compounds, are added in an amount from 0.1 to 30% by weight to the raw material or during the mixing of the raw materials, for hydrothermal treatment or for annealing.

17. The method according to claim 4, wherein hydrothermal treatment occurs at a temperature of 150° C. to 250° C., with a water/solids ratio of 2 to 20, and retention times of 1 to 16 hours.

18. The method according to claim 17, wherein the intermediate product is annealed at a temperature of 625° C.±2° C. with a retention time of 1 to 3 seconds.

19. The method according to claim 3, wherein additional elements, also in the form of compounds, are added in an amount from 0.1 to 30% by weight to the raw material or during the mixing of the raw materials, for hydrothermal treatment or for annealing.

20. The method according to claim 3, wherein the intermediate product is annealed at a temperature of 625° C.±2° C. with a retention time of 1 to 3 seconds.

* * * * *